United States Patent [19]

Tanaka et al.

[11] Patent Number: 4,536,005
[45] Date of Patent: Aug. 20, 1985

[54] FRONT LEG SHIELD FOR A MOTOR SCOOTER

[75] Inventors: Norio Tanaka, Tokyo; Takeo Miura, Saitama; Jiro Miyata, Tokyo, all of Japan

[73] Assignee: Honda Giken Kogyo Kabushiki Kaisha, Tokyo, Japan

[21] Appl. No.: 473,136

[22] Filed: Mar. 7, 1983

[30] Foreign Application Priority Data

Mar. 19, 1982 [JP] Japan ................................. 57-44088

[51] Int. Cl.³ ............................................. B62J 17/06
[52] U.S. Cl. .................................. 280/289 S; 16/334; 296/78.1
[58] Field of Search .................. 280/289 S, 289 R; 296/78.1; 16/325, 344, 334, 322, 303, 227

[56] References Cited

U.S. PATENT DOCUMENTS 2,792,899  5/1957  Piatti .............................. 296/78.1 X
4,331,358  5/1982  Johnson ............................ 280/289 S

FOREIGN PATENT DOCUMENTS 85077    2/1956  Denmark ......................... 280/289 S
1055385  4/1959  Fed. Rep. of Germany ..... 296/78.1
47025    6/1962  Poland ............................. 296/78.1
248533   3/1926  United Kingdom .............. 296/78.1

Primary Examiner—John A. Pekar
Attorney, Agent, or Firm—Lyon & Lyon

[57] ABSTRACT

A shield for a motor scooter to protect the front legs of the operator. The shield includes extension panels pivotally mounted about hinges to the upper front panel. The extension panels may be oriented to assume multiple positions which can selectively remove the panels from the windstream, direct additional air toward the rider and provide additional shielding against air flow. Hinge mechanisms including oblong hinge pins are employed to provide various stable positions for the extension panels.

9 Claims, 14 Drawing Figures

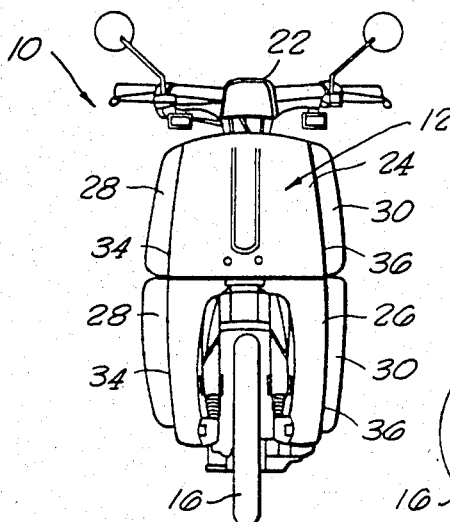
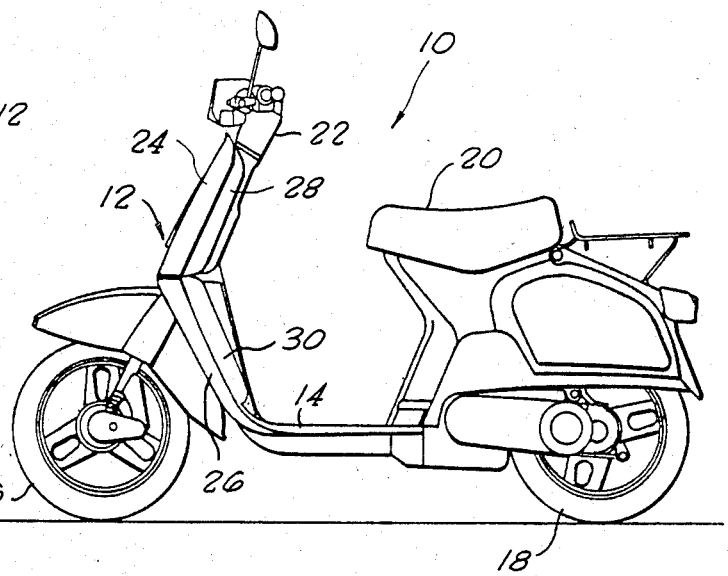
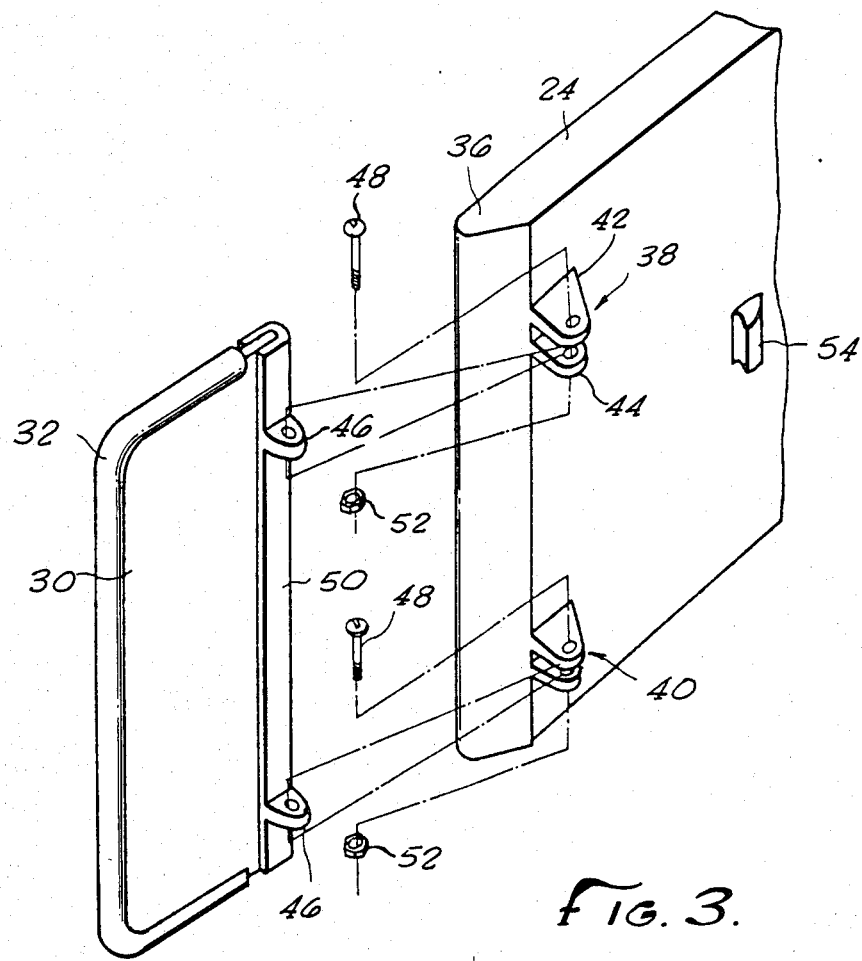

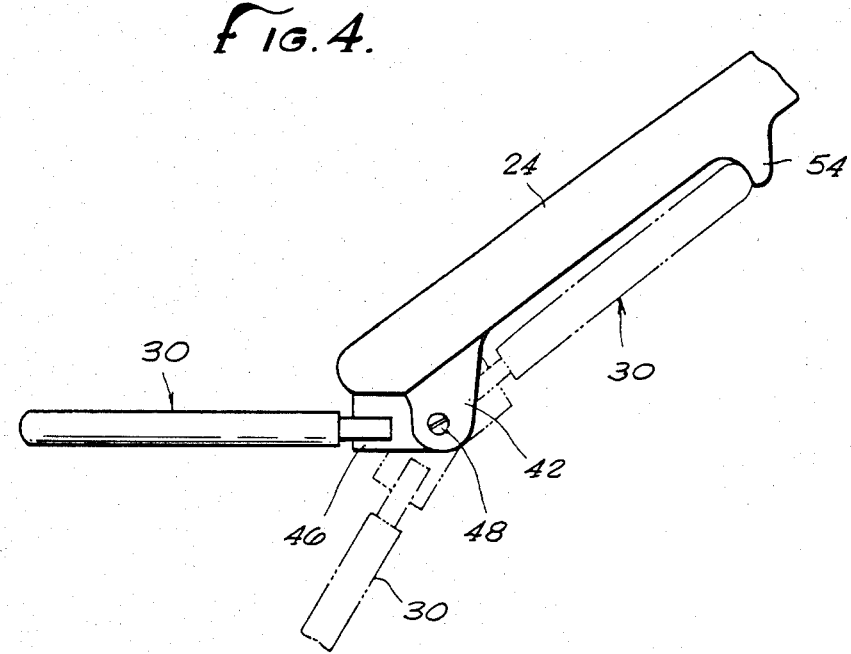
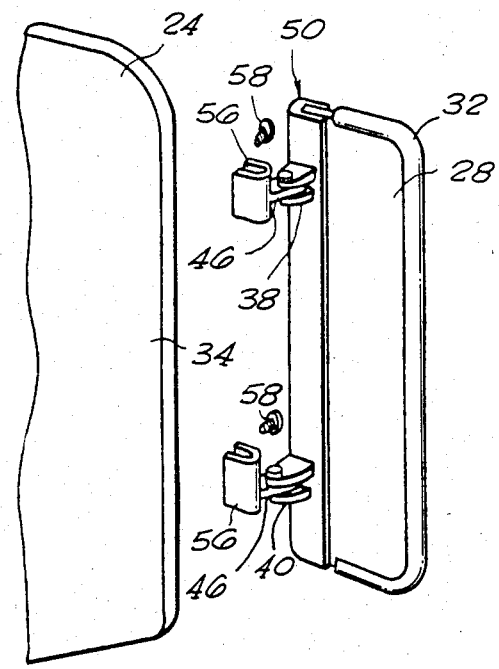
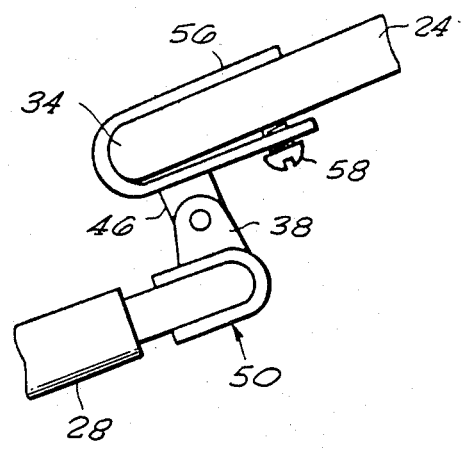

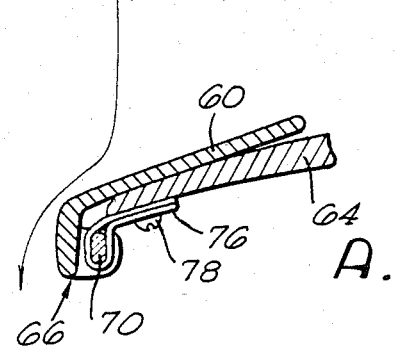
FIG. 9.
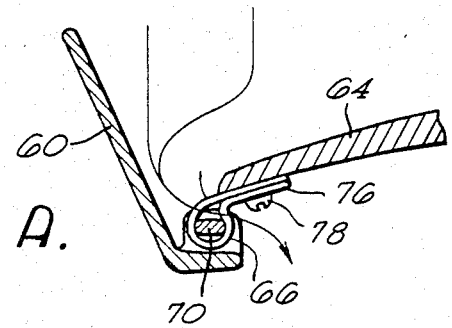
FIG. 10.
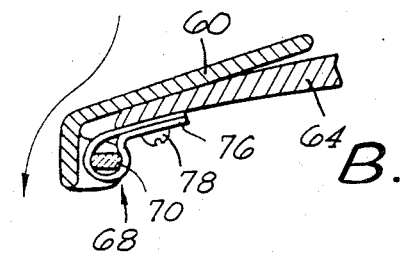
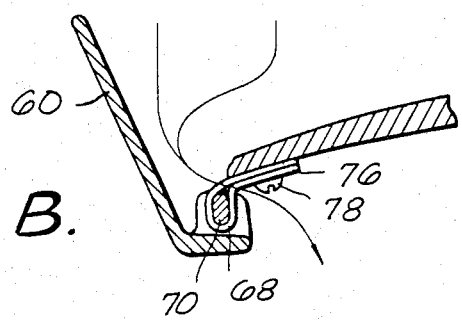
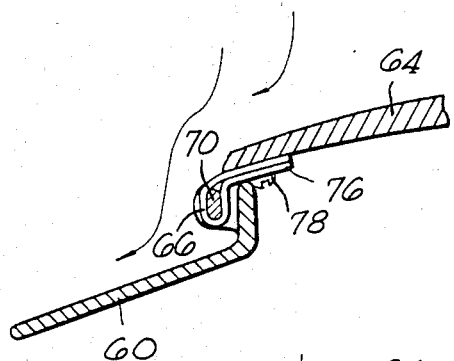
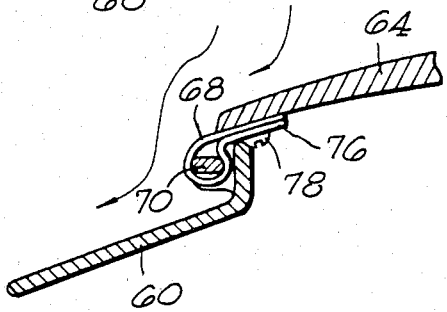
FIG. 11.

FRONT LEG SHIELD FOR A MOTOR SCOOTER

BACKGROUND OF THE INVENTION

The field of the present invention is shielding for motor scooters.

Leg shields for motor scooters have been provided for the purpose of developing air flow which results in a covering of the knees and lower legs against rain and cold. Such shields are desirably as wide as possible to accommodate this function. However, motor scooters are often selected over other vehicles because of their ability to fit through narrow places, into narrow parking areas and the like. For this purpose, it is desirable that the motor scooter and the front leg shield thereof be as small as possible. Consequently, there is a conflict between the two requirements necessary to satisfy the foregoing advantages. Heretofore, a compromise has been required.

Conflicting requirements also exist between the advantageous employment of a front leg shield to protect against the rain and cold in winter and the absence of a front leg shield for cool driving during hot weather. These conflicting requirements have often only been satisfied by removal of portions or all of the leg shield during hot conditions.

SUMMARY OF THE INVENTION

The present invention is directed to an improved leg shield for motor scooters and particularly one having a variable shield width. This is accomplished by having a front panel and two extension panels which selectively extend outwardly from the side edges of the front panel. Such a feature allows maximum width for rain and wind protection and yet enables the motor scooter to fit within narrow spaces.

In a second aspect of the present invention, such extension panels are positionable in a first, retracted position against the front panel, a second, vent position at 90° to the juxtaposed position so air may be directed through a gap between panels toward the rider, and a third, shield position 180° from the juxtaposed position. This may be accomplished by means of two hinges with oblong hinge pins having cross sections arranged at 90° to one another and oblong resilient hinge members. Thus, stable positions are created at each 90° increment.

Accordingly, it is an object of the present invention to provide an improved front leg shield for motor scooters. Other and further objects and advantages will appear hereinafter.

BRIEF DESCRIPTION OF THE DRAWINGS

FIG. 1 is a front view of a motor scooter and a front leg shield of the present invention.

FIG. 2 is a side elevation of a motor scooter and front leg shield of the present invention.

FIG. 3 is a detailed exploded assembly view of a portion of the front leg shield of the present invention.

FIG. 4 is a plan view of a portion of a front leg shield of the present invention.

FIG. 5 is an exploded view of a second embodiment of a portion of the leg shield of the present invention.

FIG. 6 is a plan view of the embodiment of FIG. 5.

FIG. 9 is a cross-sectional plan view of the hinges and extension panel of the front leg shield of FIG. 7 with part A illustrating the upper hinge and part B illustrating the lower hinge.

FIG. 10 is a cross-sectional plan view of the hinges and extension panel of the front leg shield of FIG. 7 with part A illustrating the upper hinge and part B illustrating the lower hinge.

FIG. 11 is a cross-sectional plan view of the hinges and extension panel of the front leg shield of FIG. 7 with part A illustrating the upper hinge and part B illustrating the lower hinge.

DETAILED DESCRIPTION OF THE PREFERRED EMBODIMENT

Figure 7:
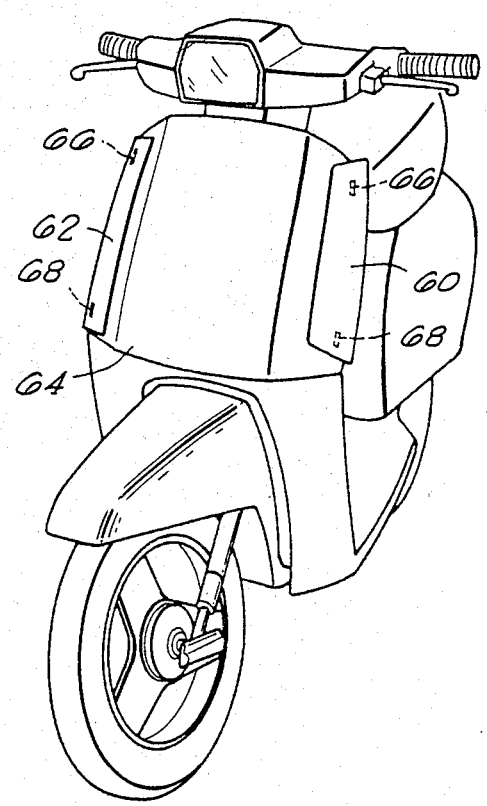
FIG. 7 is a motor scooter and third embodiment of a front leg shield shown in perspective.

Turning in detail to the drawings, FIGS. 1 and 2 illustrate a motor scooter 10 having a front leg shield 12, a frame 14, front and rear wheels 16 and 18, a seat 20 and a front wheel steering and handlebar assembly 22. As can be seen from the Figures, the motor scooter 10 is of the type wherein the rider sits on the seat 20 and places his or her legs forwardly in a sitting position rather than straddling the device as would be true of a motor cycle. Thus, the front leg shield 12 may be provided to protect the lower part of the rider from wind, cold and rain.

Turning in detail to the front leg shield 12, the shield includes an upper front panel 24 and a lower front panel 26. These panels 24 and 26 are rigidly held in a symmetrical position to the front of the motor scooter 10. The panels 24 and 26 may be generally fastened to the frame 14 of the motor scooter for support. These panels may be made of metal sheet but are advantageously made from lightweight, resilient polymeric material.

As can be seen in position in FIGS. 1 and 2 and as can be seen in greater detail in FIGS. 3 and 4, each of the front panels 24 and 26 includes two extension panels 28 and 30. For convenience and appearance, the panels 28 and 30 are identical but reversed. Additionally, the panels are conveniently made of polymeric material and may be transparent or translucent for increased drivability if that is desired. The panels may be provided in any shape but are shown to be elongate in a direction parallel to their attachment to extend the full length of each panel 24 and 26 and to extend outwardly several inches. On the outer periphery of each extension panel 28 and 30 there is affixed a resilient strip 32, preferably of rubber, to provide added shock resistance to the shield.

To affix the extension panels 28 and 30 to the front panels 24 and 26, attachment mechanisms are employed which allow selective positioning of the extension panels 28 and 30 outwardly of the front panels 24 and 26 at the side edges 34 and 36 thereof. These attachment mechanisms employed in the preferred embodiment include hinges 38 and 40. Naturally, other mounting mechanisms may be employed which allow extension and retraction of the extension panels 28 and 30 relative to the front panels 24 and 26.

As illustrated in FIG. 3, the hinges 38 and 40 each include hinge projections 42, 44 and 46 which cooperate with a hinge pin 48. The hinge projections 42 and 44 are shown to be integral with the front panels 24 and 26 while the hinge projection 46 is shown to be formed with a channel member 50 which may be positioned on and bonded to each of the extension panels 28 and 30. The pins 48 include a smooth shank with a threaded end. The smooth shank cooperates with the hinge projections while the threaded end receives locking nuts 52.

FIG. 4 illustrates a device much like that of FIG. 3 with the hinge projection 46 associated with the extension panels 28 and 30 in a slightly revised position. The various positions available to the extension panels are illustrated both in full and phantom. With the extension panel juxtaposed against the front panel, a retainer projection 54 is positioned to receive and hold the extension panel.

An alternate embodiment is illustrated in FIGS. 5 and 6 including a similar hinge mechanism wherein the hinge projection 46 is fixed to a channel member 56 rather than having hinge projections integral with the front panels 24 and 26. Set screws 58 retain the channel member 56 in position on the extension panels 28 and 30 as can best be seen in FIG. 6. Such an arrangement is particularly adaptable for but not limited to retrofit installations.

Figure 8:
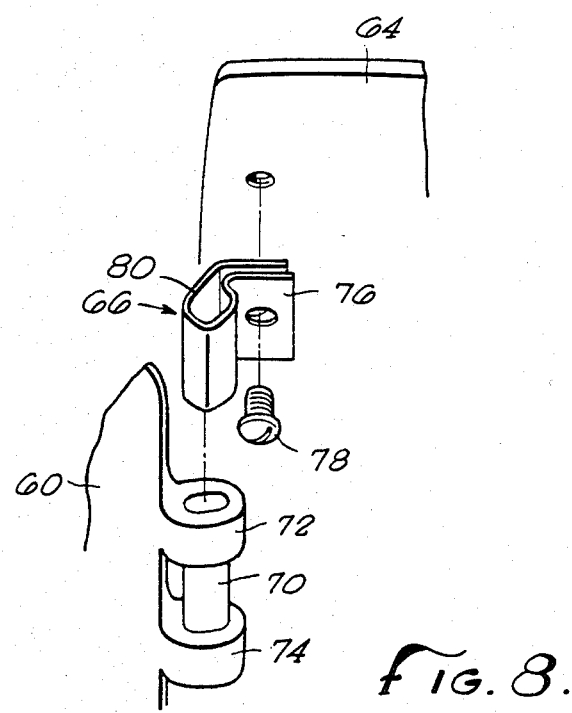
FIG. 8 is an exploded assembly detail of a hinge of the embodiment of FIG. 7.

An alternate embodiment is also illustrated in FIGS. 7-11. This embodiment includes extension panels 60 and 62 associated with an upper front panel 64. A variation in the attachment mechanism is employed to provide three specific positions for the panels 60 and 62 relative to the upper front panel 24. Two hinges 66 and 68 are illustrated with each of the extension panels 60 and 62. Fixed rigidly with the extension panels 60 and 62 are hinge pins 70. The hinge pins 70 are retained within mounting bosses 72 and 74. The cross section of each hinge pin 70 is oblong having a major and minor cross-sectional dimension. The term "oblong" is intended to refer to a variety of shapes which may include a cross section having a variation between the effective length and effective width. The hinge pin 70 is shown in FIG. 8 to be force fit into the bosses 72 and 74.

The hinges 66 and 68 further include a hinge member 76 fixed to the upper front panel 64 by means of a fastener 78. The hinge member 76 is of resilient or spring material and is formed such that an oblong hole is defined therethrough. The oblong hole 80 is designed to closely fit the hinge pin 70 with the hinge pin 70 oriented in a first direction. The hinge member 76 is also designed to have sufficient resilience such that the pin may be forced to rotate through at least 180°. However, when the pin has rotated 90° from a position of relaxed orientation within the hole 80, it is in an unstable position. However, the pin 70 of the other hinge is oriented such that the cross-sections are arranged at 90° with respect to one another. Thus, when the first pin 70 is stressed within the hinge member 76, the second pin 70 is in the relaxed state within the hinge member 76. Thus, as can be seen in FIGS. 9, 10 and 11, three positions are available at which one of the two hinge pins 76 is oriented in the relaxed condition. Hence, the extension panels 60 and 62 will remain properly positioned when in juxtaposition with the upper front panel 64 (FIG. 9), 90° thereto (FIG. 10) and 180° thereto (FIG. 11). Each of these figures illustrates both the top and bottom hinge 66 and 68; and it can be seen that the hinge pins 70 are oriented at 90° to one another.

Looking then to the functional aspects of FIGS. 9, 10 and 11, a bend is included in the extension panels 60 and 62 adjacent to the attachment mechanisms for more appropriate orientation of the assembly. In FIG. 9, the extension panel is illustrated in juxtaposition with the front side of the upper front panel 64. In this orientation, the extension panel is retracted from any position which would affect the air flow. In FIG. 10, the extension panel has been moved 90° to a second position. This second position forces air collected by the entire shield to flow through a gap defined between the extension panel and the upper front panel towards the operator. Thus, cooling flow is directed to the operator during forward movement. In FIG. 11, the extension panel is arranged at 180° from the juxtaposed position. In this position, the edge of the extension panel rests against the front panel and the extension panel extends outwardly to block additional wind, rain and cold from reaching the operator.

Thus, a plurality of embodiments have been illustrated showing improved front leg shields which may be oriented and selectively moved to provide maximum effect and maximum utility of a motor scooter to which they may be mounted. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A front leg shield for a motor scooter, comprising
   a front panel symmetrically positionable on the front of a motor scooter;
   a first extension panel;
   a second extension panel;
   a first attachment mechanism fixed to said front panel at a first side edge thereof and to said first extension panel at an edge thereof;
   a second attachment mechanism fixed to said front panel at a second side edge thereof and to a second extension panel at an edge thereof, each said attachment mechanism including a first and second hinge, each said hinge having a hinge member fixed to one of said front panel and said extension panel and a hinge pin fixed to the other of said front panel and said extension panel, said hinge pin being oblong in cross section having a major cross-sectional dimension and a minor cross-sectional dimension, said hinge member having an oblong hole for resilient receipt of said hinge pin, the long axis of said hinge pin of said first hinge being perpendicular to the major dimension of said hinge pin of said second hinge.

2. The front leg shield of claim 1 wherein said extension panels selectively extend in juxtaposition with the front of said front panel, 90° to said juxtaposed position and 180° to said juxtaposed position.

3. The front leg shield of claim 2 further including a gap between said front panel and each said extension panels when said extension panels extend at 90° to said juxtaposed position.

4. The front leg shield of claim 1 wherein said first and second attachment mechanisms are oriented such that a first stable position for each said extension panel is in juxtaposition with said front panel.

5. The front leg shield of claim 4 wherein a second stable position of each said extension panel is extending outwardly of said front panel and being inclined rearwardly to the motor scooter.

6. The front leg shield of claim 5 wherein a third stable position for each said extension panel is extending outwardly of said front panel and being inclined forwardly to the motor scooter.

7. The front leg shield of claim 6 wherein said first and second attachment mechanisms extend from said front panel and said extension panels such that a gap is created between said front panel and each said extension panel with said extension panel in said third position.

8. A front leg shield for a motor scooter comprising
a front panel symmetrically positionable on the front of a motor scooter,
a first extension panel having a first attachment mechanism fixed thereto,
a second extension panel having a second attachment mechanism fixed thereto,
each of said first and second attachment mechanisms including a hinge and being fixed to said front panel at a side edge thereof and being constructed and arranged for selective positioning of said first and second extension panels outwardly of said front panel to increase the leg shield width and inwardly in juxtaposition with said front panel, to maintain the leg shield with each of said first and second attachment mechanisms being oriented to provide at least a first stable position for each of said first and second extension panels in juxtaposition with said front panel, a second stable position for each of said first and second extension panels extending outwardly of said front panel and inclined rearwardly to the motor scooter and a third stable position for each of said first and second extension panels extending outwardly of said front panel and inclined forwardly to the motor scooter.

9. The front leg shield of claim 8 wherein said first and second attachment mechanisms extend from said front panel and said extension panels such that a gap is created between said front panel and each said extension panel with said extension panel in said third stable position.

* * * * *